US008336806B2

(12) United States Patent  
Dierksmeier

(10) Patent No.: US 8,336,806 B2
(45) Date of Patent: Dec. 25, 2012

(54) LIFT FAN FLOW PATH DEVICE

(75) Inventor: Douglas David Dierksmeier, Franklin, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 322 days.

(21) Appl. No.: 12/630,743

(22) Filed: Dec. 3, 2009

(65) Prior Publication Data

US 2010/0166554 A1 Jul. 1, 2010

Related U.S. Application Data

(60) Provisional application No. 61/203,903, filed on Dec. 30, 2008.

(51) Int. Cl.
*B64C 15/02* (2006.01)
(52) U.S. Cl. ............... 244/12.3; 244/12.5; 244/23 A
(58) Field of Classification Search .......... 244/6, 12.4, 244/12.5, 23 A, 230 SS, 110 B
See application file for complete search history.

(56) References Cited

U.S. PATENT DOCUMENTS

| | | | |
|---|---|---|---|
| 3,061,038 A * | 10/1962 | Lawler et al. | 181/215 |
| 3,070,346 A * | 12/1962 | Kennedy | 251/266 |
| 4,456,203 A | 6/1984 | Louthan | |
| 4,506,850 A * | 3/1985 | McConnell | 244/54 |
| 5,031,836 A | 7/1991 | Ward | |
| 5,033,693 A | 7/1991 | Livingston et al. | |
| 5,096,012 A | 3/1992 | Chia et al. | |
| 5,117,533 A | 6/1992 | Stuller | |
| 5,279,109 A | 1/1994 | Liu et al. | |
| 5,769,317 A * | 6/1998 | Sokhey et al. | 239/1 |
| 6,135,388 A | 10/2000 | Hostetter | |
| 6,561,456 B1 | 5/2003 | Devine | |
| 6,669,552 B1 | 12/2003 | Beer | |
| 2009/0197516 A1* | 8/2009 | Wright et al. | 454/119 |

\* cited by examiner

*Primary Examiner* — Christopher P Ellis
*Assistant Examiner* — Medhat Badawi
(74) *Attorney, Agent, or Firm* — Krieg DeVault LLP

(57) ABSTRACT

A flow path is disclosed that is capable of being deployed when needed and stowed in a relatively small space when not in use. The flow path device is flexible and may be made from a variety of materials. In an illustrative embodiment the flow path device is annular and transitions from an ellipsoidal annular shape to a quadrilateral annular shape. A vane box can be disposed at one end of the flow path device. Doors can be coupled to the vane box to cover the flow path device. The doors can be used to provide a structural load path for the flow path device and vane box. The doors and the flow path device can be moved together such that the doors uncover the flow path device as the device is deployed.

19 Claims, 3 Drawing Sheets

LIFT FAN FLOW PATH DEVICE

CROSS REFERENCE TO RELATED APPLICATIONS

The present application claims the benefit of U.S. Provisional Patent Application 61/203,903, filed Dec. 30, 2008, and is incorporated herein by reference.

FIELD OF THE INVENTION

The present invention generally relates to lift fan flow path devices, and more particularly, but not exclusively, to stowable flow path devices.

BACKGROUND

Vehicles having sizing constraints or sizing goals may sometimes employ techniques to stow certain equipment, structure, or other useful devices. Examples of such constraints or goals include carrier-based aviation vehicles capable of being compactly stowed between operational uses, among others. Some vehicles may have a need to stow or otherwise compact a flow path that may be used to direct a flow of air. Examples include machines capable of hovering but that nonetheless have volume constraints or goals that require a flow path used for hovering that can be reduced in size to fit into a smaller volume until needed. Some existing systems have various shortcomings relative to certain applications. Accordingly, there remains a need for further contributions in this area of technology.

SUMMARY

One embodiment of the present invention is a unique stowable flow path for an aircraft. Other embodiments include apparatuses, systems, devices, hardware, methods, and combinations for stowing aircraft flow paths. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
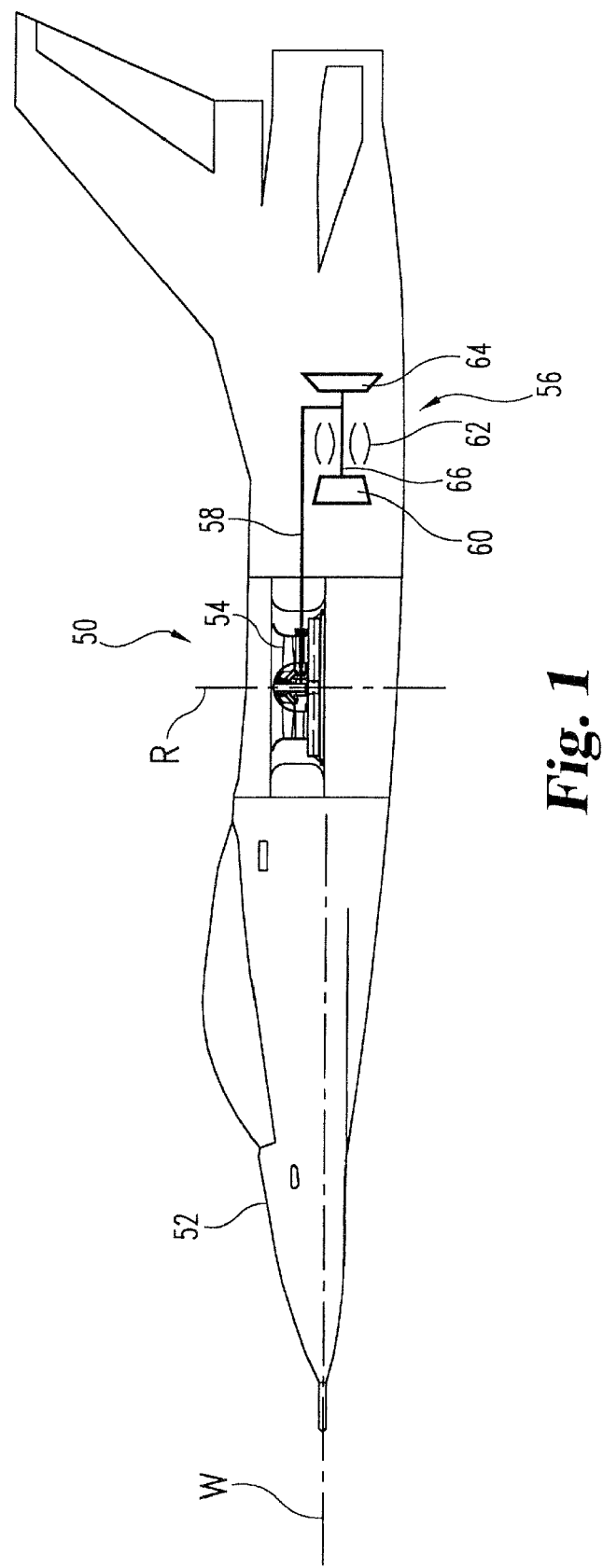
FIG. 1 depicts an aircraft having one embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Turning now to FIG. 1, a vertical lift system 50 is shown installed in an aircraft 52 and is used to provide vertical thrust to aid the aircraft during phases of flight such as take-off, maneuvering, or hover, to set forth just three non-limiting examples. As used herein, the term "aircraft" includes, but is not limited to, airplanes, uninhabited air vehicles, fixed wing vehicles, variable wing vehicles, rotary wing vehicles, and others. The vertical lift system 50 includes a lift fan 54 operatively coupled with a gas turbine engine 56 via a shaft 58. The vertical lift system 50 provides a force along the axis R to generate lift for the aircraft 52. The axis R is substantially perpendicular to an aircraft waterline W, but in some embodiments may be oriented at an angle.

The gas turbine engine 56 includes a compressor 60, a combustor 62, and a turbine 64. A spool shaft 66 connects the compressor 60 to the turbine 64. The gas turbine engine 56 depicted in the illustrative embodiment is a single spool engine, but other embodiments may have additional spools. The gas turbine engine is a turbojet in the illustrative embodiment, but can take other forms such as, but not limited to, turbofans and turboprops. In addition, the gas turbine engine 56 can be integrated into a multi-mode propulsion system, or may be configured as an adaptive engine in some embodiments.

The shaft 58 is coupled to the spool shaft 66 and provides power to the vertical lift system 50. The shaft 58 can be coupled to the spool shaft 66 with a gearing and/or a clutch (not shown). In other embodiments the shaft 58 can be coupled to a generator that derives power from the spool shaft 66. Other techniques of transferring power from the gas turbine engine 56 to the vertical lift system 50 are contemplated herein.

Figure 2A:
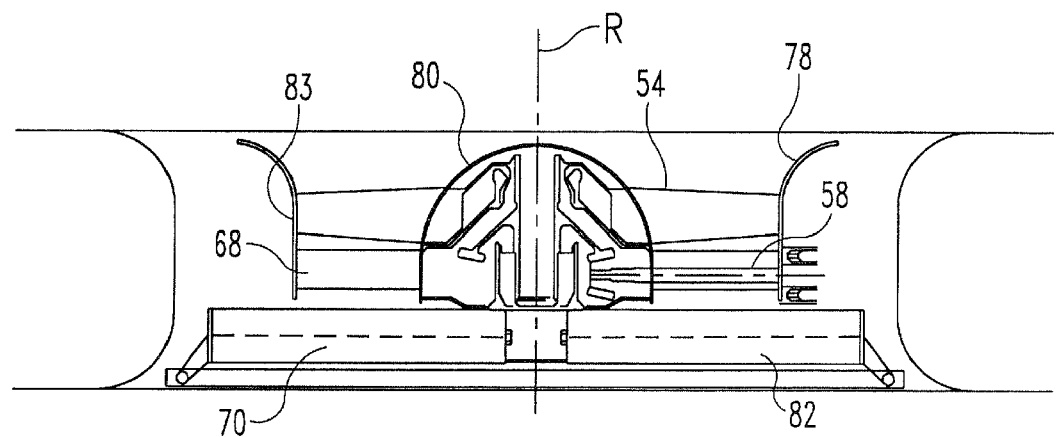
FIG. 2a is a side view of one embodiment of the present application.
Figure 2B:
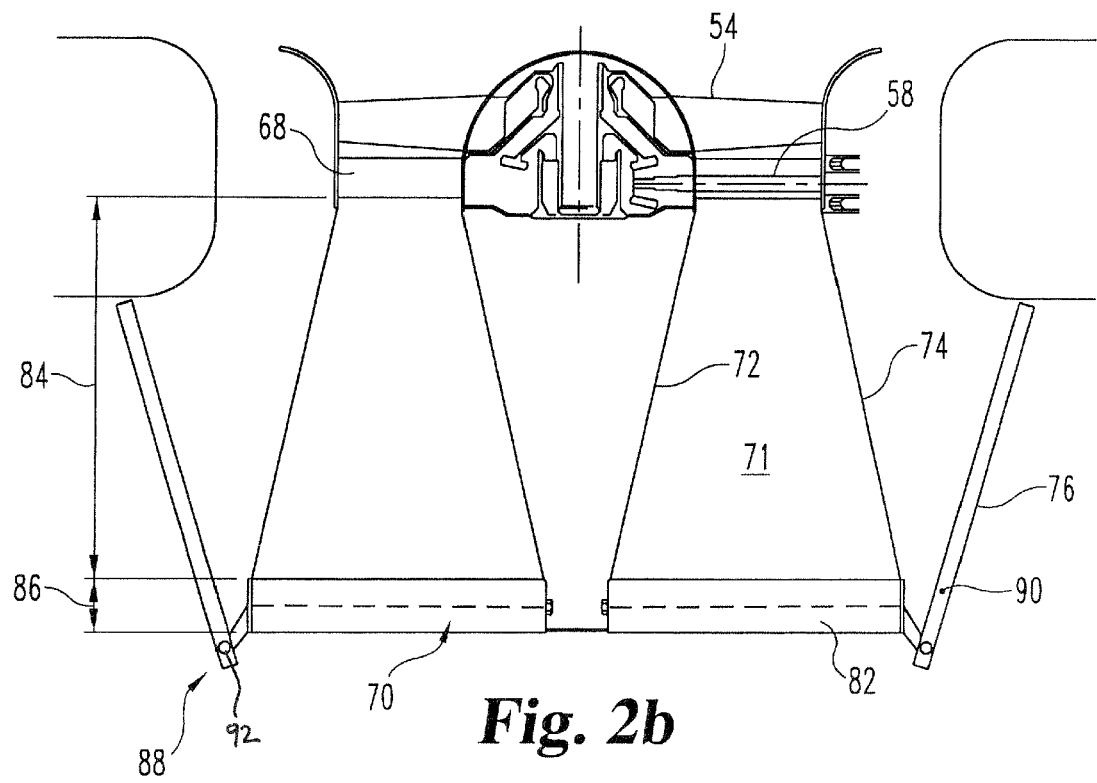
FIG. 2b is a side view of one embodiment of the present application.

Turning now to FIGS. 2a and 2b, and with continuing reference to FIG. 1, a partial side view is shown of the vertical lift system 50. The vertical lift system 50 is capable of providing vertical lift to the aircraft 52 by providing a conduit through which working fluid that is pressurized and/or accelerated by the lift fan 54 is passed. The working fluid can be air in some embodiments. The vertical lift system 50 includes a stowed position shown in FIG. 2a and an extended position shown in FIG. 2b. The vertical lift system 50 generally produces a higher flow rate of working fluid in the extended position than in the stowed position. In some embodiments the flow rate of working fluid is zero when the vertical lift system 50 is in the stowed position. In one form the vertical lift system 50 includes the lift fan 54, struts 68, a vane box 70, a lift fan flow path 71, an inner flow path member 72, an outer flow path member 74, and doors 76.

The lift fan 54 includes several blades and rotates about the axis R. The lift fan 54 is capable of producing a wide variety of flow rates and can be used to provide all or a portion of the lift required to sustain an aircraft or other vehicle. In some embodiments the lift fan 54 can take other forms suitable for generating a flow of working fluid. For example, the lift fan 54 can take the form of a high bypass ratio fan that provides a flow of working fluid to produce a vertical lift, to set forth merely one non-limiting example. In some embodiments, the lift fan 54 can be selectively powered independent of the operation of the gas turbine engine 56.

In the illustrative embodiment the struts 68 extend from a fan casing 78 to a fan hub 80 and are circumferentially arranged in the annular area downstream of the lift fan 54. Other configurations of the struts 68 are also contemplated. Any number of struts 68 may be included in alternative embodiments. The struts 68 can have airfoil cross sectional shapes and can have generally the same dimensions. At least one strut in the illustrative embodiment includes a space for the passage of the shaft 58 from the gas turbine engine 56 to the lift fan 54. Some embodiments, however, may not include any struts 68 that provide for the passage of the shaft 58. In some embodiments the struts 68 may be referred to as vanes and may be used to swirl or de-swirl an airflow passed from the lift fan 54.

The lift fan flow path 71 provides a path for a flow of working fluid from the lift fan 54. In the illustrative embodiment the lift pan flow path 71 is formed between the inner flow path member 72 and the outer flow path member 74, but in some embodiments the inner flow path member 72 may not be present. The inner flow path member 72 and/or the outer flow path member 74 are formed in whole, or in part, of a lightweight, flexible, composite material. Other material types having flexible properties may also be used whether or not they are lightweight and/or composite. In one form the flow path members 72 and 74 are formed of aromatic polyamide fibers such as that produced under the trademark KEVLAR, which is available from E. I. du Pont de Nemours and Company of Wilmington, Del. In another form the flow path members 72 and 74 are formed of graphite/polyurethane. The inner flow path member 72 and/or the outer flow path member 74 can have a portion or portions that are not flexible. In the illustrative form the inner flow path member 72 extends from the fan hub 80 to the vane box 70, while the outer flow path member 74 extends from the fan casing 78 to the vane box 70. In other embodiments the flow path members 72 and 74 can extend from other aircraft structure, which can include the fan hub 80, the vane box 70, and the fan casing 78.

The vertical lift system 50 can be placed in the stowed position shown in FIG. 2a by collapsing the flow path members 72 (if present) and 74. In some applications, the vertical lift system 50 can fit into a confined space such as an aircraft wing or other like location. When needed during some modes of operation, the lift fan flow path 71 can be fully or partially un-collapsed. To set forth a non-limiting example of collapsing and extending the vertical lift system 50, the outer flow path member 74 can be stowed by bringing its ends towards each other to shorten overall length. The outer flow path member 74 can be folded upon itself in regular or irregular patterns and can include one or many folds. The folds can be stacked upon each other in succession or can be randomly bunched. The vertical lift system 50 is placed in the extended position when the ends of the outer flow path member 74 are moved away from each other and the folds are straightened and/or lessened. The extended position can be characterized by an outer flow path member 74 that is smooth, but in some forms the outer flow path member 74 can include some variations such as, but not limited to, corrugations.

The lift fan flow path 71 may have any variety of shapes and orientations. In the illustrative embodiment the lift fan flow path 71 extends along the axis R, but in other embodiments may extend along an axis oriented at an angle to the axis R. The lift fan flow path 71 is annular in the illustrative embodiment and transitions from an ellipsoidal annular shape at an upstream end to a quadrilateral annular shape at the downstream end. In some embodiments, however, the lift fan flow path 71 may not be annular where, for example, the inner flow path member 72 may not be present. In one non-limiting form the ellipsoidal annular shape is circular and the quadrilateral annular shape is square. Other shapes and variations are also possible in other embodiments. The lift fan flow path 71 may or may not be tapered. In other embodiments a fixed flow path might be provided between the lift fan 54 and the lift fan flow path 71. To set forth just one non-limiting example, a casing 83 can be extended to a point further downstream of the struts 68 than that depicted in the illustrative embodiment. Such a fixed flow path can be any length and can be straight or have one or more bends.

The vane box 70 can be coupled to the outer flow path member 74 and can be used to provide an exit flow aperture through which a flow stream of working fluid passes. The vane box 70 can be coupled in a variety of manners. For example, the van box 70 can be clamped, riveted, or sewn within the flexible outer flow path member 74, to set forth just a few non-limiting examples. In some embodiments the vane box 70 may be integrally formed with the lift fan flow path 71, such as would be the case, for example, if the outer flow path member 74 is folded upon itself to create the vane box 70 or a portion thereof. The lift fan flow path 71 may be attached using any suitable method such as riveting or clamping, to set forth just two non-limiting examples.

In the illustrative form the vane box 70 includes several vanes which are described further hereinbelow in reference to FIG. 3b. The vane box 70 is quadrilateral in shape in the illustrative embodiment, and in particular is depicted as a square, but can also have other shapes in different embodiments. The vane box 70 can be centered about and perpendicular to the axis R, but may not be centered and may not be perpendicular to the axis R in all embodiments. The vane box 70 has a cross-sectional area through which passes an air stream flowing through the lift fan flow path 71. The vane box 70 includes edges 82 that have a height 86. The height 86 is substantially constant around the periphery of the vane box 70, but in some embodiments the height 86 may vary. The height 86 can be less than the length 84 of the lift fan flow path 71 as shown in the illustrative embodiment. The vane box 70 can be lowered by an actuator, by cable and pulley, or any other suitable mechanism.

The doors 76 can be used as structural members to transmit loads from the vane box 70 to an airframe of the aircraft 52. However, the doors 76 in some embodiments may not transmit structural loads. Furthermore, structure other than the doors 76 can be used to transmit loads in some embodiments. The doors 76 are depicted in a closed condition in FIG. 2a and in an open position in FIG. 2b. In one form, as the doors 76 are opened they can be used to guide the vane box 70 downward to the extended position such that movement of the doors 76 is accompanied by movement in the lift fan flow path 71. The doors 76 can be moved by an actuator, cables and pulley, and any other type of device that may be used to impart a force to the doors 76. In some embodiments the doors 76 may be spring loaded to the closed position, the open position, or to any other intermediate position. In some embodiments the doors 76 can be moved to their open position prior to extension of the lift fan flow path 71. In still other embodiments, the doors 76 can be moved after extension of the lift fan flow path 71. Two doors 76 are depicted in the illustrative embodiment, but other embodiments can include fewer or more doors 76. In some embodiment the doors 76 may not be needed.

The doors 76 can be coupled with the vane box 70 through a track and roller assembly 88. In the illustrative form, the doors 76 include a track 90 within which slides a roller 92 attached to the vane box 70. In other embodiments, however, the doors may include the roller 92 and the vane box 70 may include the track 90. The roller 92 can be configured to roll and/or slide as the door 76 moves relative to the vane box 70. In the illustrative embodiment, as the vane box 70 is extended to a deployed position, the doors 76 slide away from the axis R and pivot. In some embodiments the doors 76 can slide and then pivot while other embodiments can pivot then slide. In some embodiments the doors 76 may not be coupled with the vane box 70 and, therefore, may be capable of independent movement.

Figure 3B:
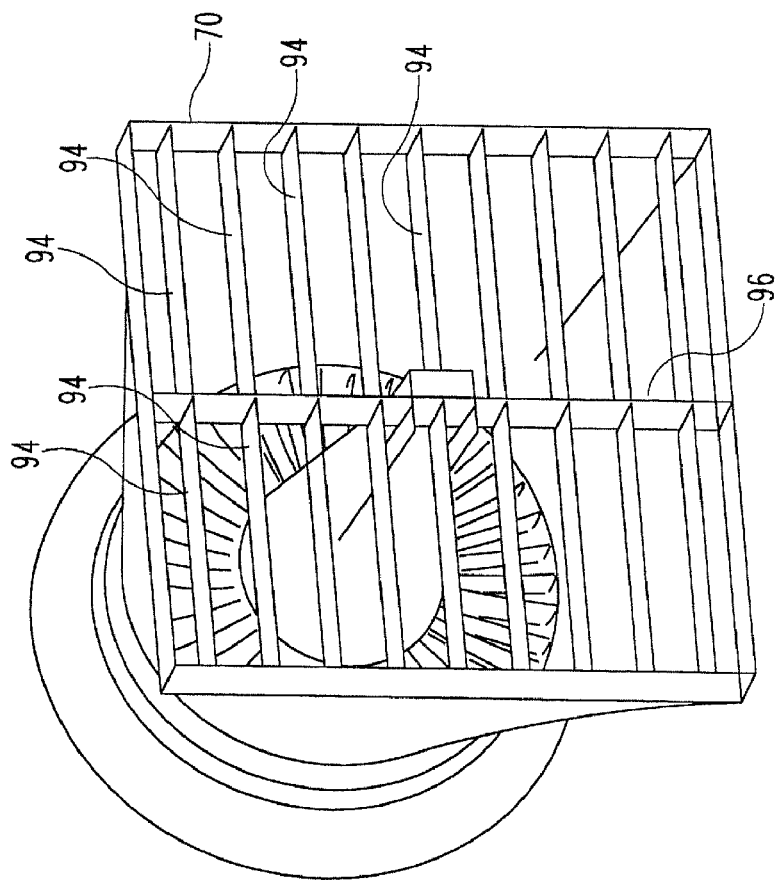
FIG. 3b is another view of one embodiment of the present application.
Figure 3A:
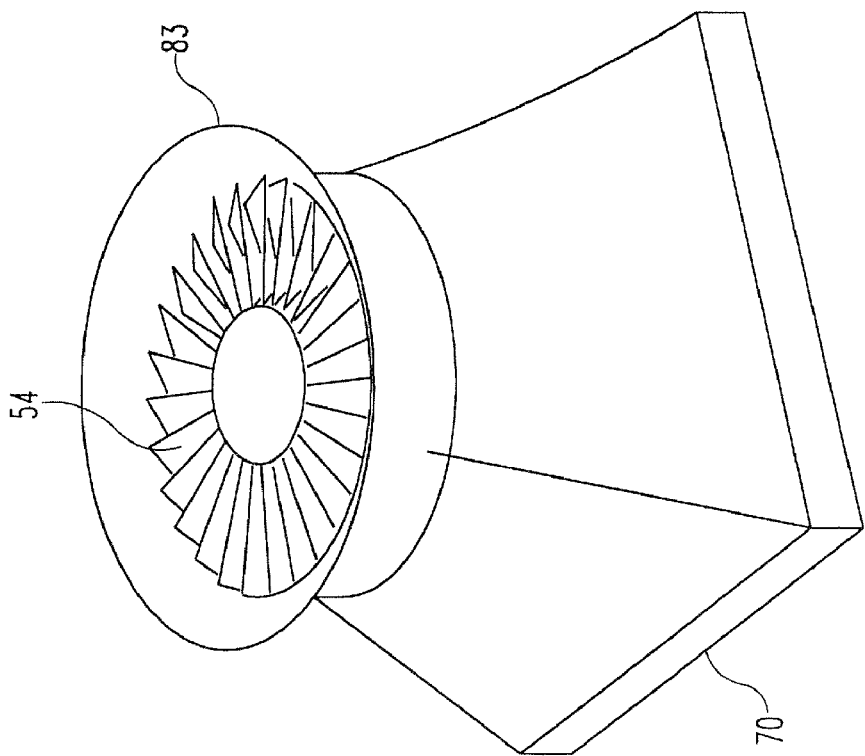
FIG. 3a is another view of one embodiment of the present application.

Turning now to FIGS. 3*a* and 3*b*, perspective views are shown of at least part of the vertical lift system 50. The casing 83 can be seen extending between an inlet of the lift fan 54 to the outer flow path member 74. The outer flow path member 74 extends between the casing 83 and the vane box 70.

In the illustrative form the vane box 70 includes several vanes 94 extending across a width of the vane box 70. Some embodiments, however, may lack the vanes 94. The vanes 94 are disposed on either side of a splitter 96 that extends across a dimension of the vane box 70. Some embodiments may lack a splitter 96, while other embodiments may use more than one splitter 96. The vanes 94 are airfoil shaped, but may be other shapes in different embodiments. Not all vanes 94 need have the same shape. The vanes 94 are generally aligned in same direction, but may not be in other embodiments. For example, the vanes 94 may be split with half of the vanes 94 oriented in one direction and other half in another direction.

One aspect of the present application includes a lift fan having a collapsible flow path that may extend to a deployed position. The collapsible flow path provides a flow path for air that has been accelerated by the lift fan. Doors are provided and may be used to cover the lift fan when not in use. The doors are coupled with a vane box affixed to an end of the collapsible flow path and provide a structural load path for the collapsible flow path and the vane box. The doors are capable of sliding and pivoting as the flexible flow path is deployed.

Another aspect of the present application provides an apparatus comprising a foldable lift fan airflow duct operable to be extended from a collapsed position and having a first end configured to receive a flow of working fluid from a lift fan and a second end configured to eject the flow of working fluid, the second end operable to be coupled with a device that extends or collapses the foldable lift fan airflow duct.

Yet another aspect of the present application provides an apparatus comprising a collapsible lift fan airflow duct having an annular flow path formed between a first foldable airflow member and a second foldable airflow member, the first foldable airflow member having open ends, the second foldable airflow member capable of being received within an interior of the first foldable airflow member, and the collapsible lift fan airflow duct operable to be extended from a compact position to an operating position.

Still yet another aspect of the present application provides an apparatus comprising a collapsible lift fan conduit having an outlet operable to convey a flow path for an air stream provided by an aircraft lift fan a cover operable to close at least a portion of the outlet, and means for removing the cover to expose the outlet.

A further aspect of the present application provides a method comprising unfolding a flexible lift fan flow directing device from a stowed position to a final position, withdrawing a cover operable to at least partially enclose the flexible lift fan flow directing device, and flowing a working fluid through the flexible lift fan flow directing device to provide vertical lift for an aircraft.

A still further aspect of the present application provides an apparatus comprising an extendable lift fan airflow duct operable to be extended from a collapsed position and having a first end configured to receive a flow of working fluid from a lift fan and a second end configured to eject the flow of working fluid, the second end operable to be coupled with a device that extends or collapses the extendable lift fan airflow duct.

A yet further aspect of the present application provides an apparatus comprising a collapsible lift fan airflow duct having an annular flow path formed between a first collapsible airflow member and a second collapsible airflow member, the first collapsible airflow member having open ends, the second collapsible airflow member capable of being received within an interior of the first collapsible airflow member, and the collapsible lift fan airflow duct operable to be extended from a compact position to an operating position.

Yet a still further aspect of the present application provides a method comprising extending a collapsible lift fan flow directing device from a stowed position to a final position, withdrawing a cover operable to at least partially enclose the collapsible lift fan flow directing device, and flowing a working fluid through the collapsible lift fan flow directing device to provide vertical lift for an aircraft.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   an extendable lift fan airflow duct having a flexible portion operable to be extended from a folded position and having a first end configured to receive a flow of working fluid from a lift fan and a second end configured to eject the flow of working fluid; and
   wherein the extendable lift fan airflow duct includes an annular airflow passage formed between an extendable inner portion of a radially outer airflow boundary and an extendable outer portion of a radially inner airflow boundary, wherein the extendable inner portion and extendable outer portion can be placed in the folded position to stow the extendable lift fan airflow duct and can be placed in an extended position ready to flow the working fluid from the lift fan.

2. The apparatus of claim 1, which further includes a cover operable to close the second end of the extendable lift fan airflow duct.

3. The apparatus of claim 1, wherein the flexible portion comprises one of aromatic polyamide and graphite/polyurethane.

4. The apparatus of claim 1, which further includes a cover operable to close the second end of the extendable lift fan airflow duct, the cover coupled to the extendable lift fan airflow duct through a track and roller assembly.

5. The apparatus of claim 1, which further includes the lift fan and an aircraft having a gas turbine engine, the lift fan installed in the aircraft to provide a vertical lift force; and wherein the device includes an at least partially rigid extension attached to the second end of the extendable lift fan airflow duct.

6. The apparatus of claim 5, wherein the extendable lift fan airflow duct includes an axis of extension substantially parallel to an axis of rotation of the lift fan.

7. An apparatus comprising:
a collapsible lift fan airflow duct having an annular flow path formed between an outer collapsible airflow member and an inner collapsible airflow member, the outer collapsible airflow member having open ends, the inner collapsible airflow member capable of being received within an interior of the outer collapsible airflow member, and the collapsible lift fan airflow duct operable to be extended from a compact position to an operating position.

8. The apparatus of claim 7, which further includes a vane box located at an outlet end of the collapsible lift fan airflow duct.

9. The apparatus of claim 8, which further includes a cover operable to close a portion of the vane box and coupled to the vane box through a track and roller assembly.

10. The apparatus of claim 9, wherein the vane box further includes a track and the cover further includes a roller operable to be received within the track.

11. The apparatus of claim 9, wherein the cover includes two doors operable to be independently moveable from a closed position to an open position.

12. The apparatus of claim 11, wherein the collapsible lift fan airflow duct is installed on an aircraft having a lift fan operable to provide vertical lift for the aircraft.

13. The apparatus of claim 7, wherein the first collapsible airflow member includes a foldable portion that comprises one of aromatic polyamide and graphite/polyurethane.

14. The apparatus of claim 7, wherein an inlet of the collapsible lift fan airflow duct is ellipsoidal in shape and an outlet of the collapsible lift fan airflow duct is quadrilateral in shape.

15. An apparatus comprising:
a flow path for an air stream provided by an aircraft lift fan, the flow path forming an annulus disposed between an inner collapsible conduit and an outer collapsible conduit, the inner collapsible conduit and the outer collapsible conduit structured to be placed in a collapsed position and an operation position for the passage of the air stream provided by the aircraft lift fan;
a cover operable to close at least a portion of the outlet; and
means for removing the cover to expose the outlet.

16. A method comprising:
extending a collapsible lift fan flow directing device having an inner collapsible member and an outer collapsible member forming an annulus therebetween, the extending occurring from a stowed position to a final position;
withdrawing a cover operable to at least partially enclose the collapsible lift fan flow directing device; and
flowing a working fluid through the collapsible lift fan flow directing device to provide vertical lift for an aircraft.

17. The method of claim 16, which further includes folding the collapsible lift fan flow directing device from the final position to the stowed position.

18. The method of claim 16, which further includes rotating a lift fan to produce a flow of working fluid.

19. The method of claim 16, wherein withdrawing a cover further includes sliding the cover relative to the collapsible lift fan flow directing device as the collapsible lift fan flow directing device moves between the stowed position and the final position.

* * * * *